Figure 9:
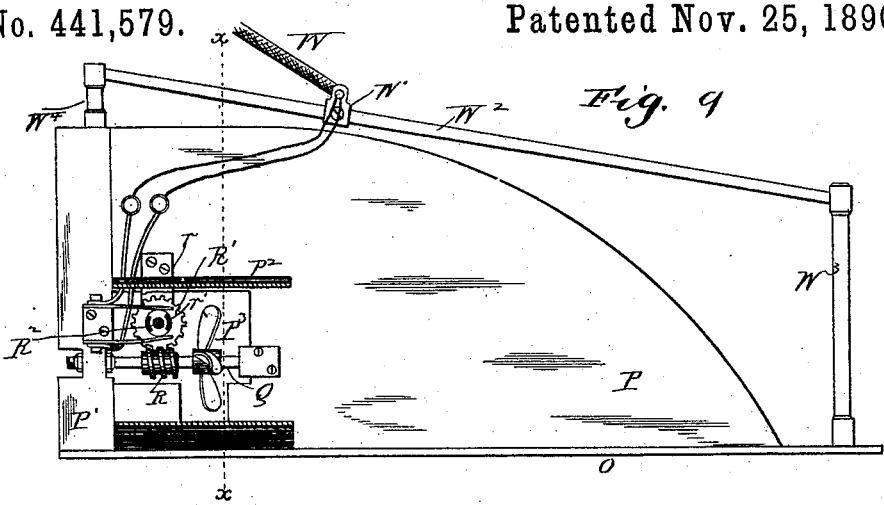

(No Model.) 7 Sheets—Sheet 1.
J. O'NEIL.
APPARATUS FOR AND METHOD OF REGISTERING AND INDICATING THE COURSE AND POSITION OF MARINE VESSELS.
No. 441,579. Patented Nov. 25, 1890.
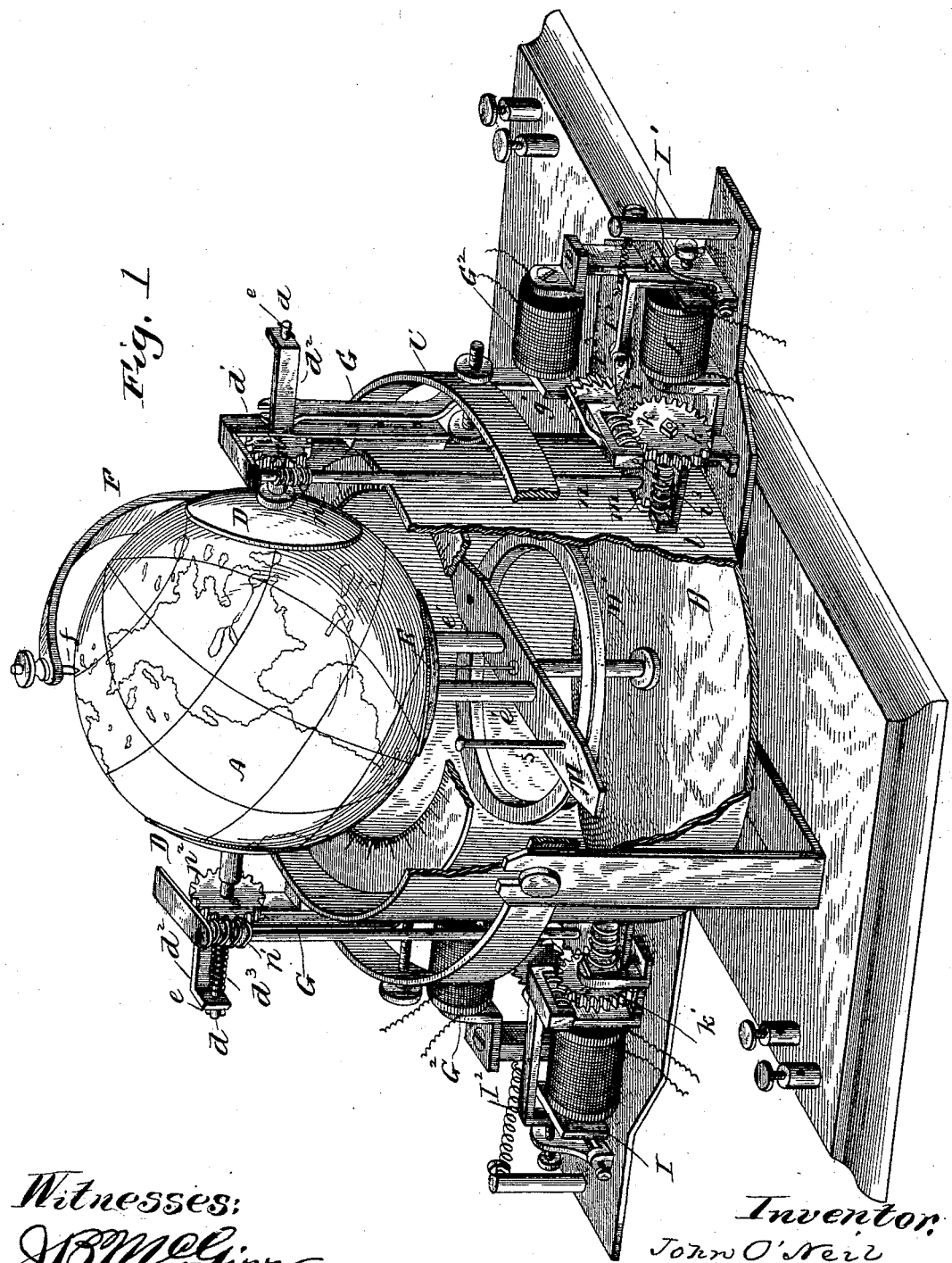

(No Model.) 7 Sheets—Sheet 2.
J. O'NEIL.
APPARATUS FOR AND METHOD OF REGISTERING AND INDICATING THE COURSE AND POSITION OF MARINE VESSELS.
No. 441,579. Patented Nov. 25, 1890.
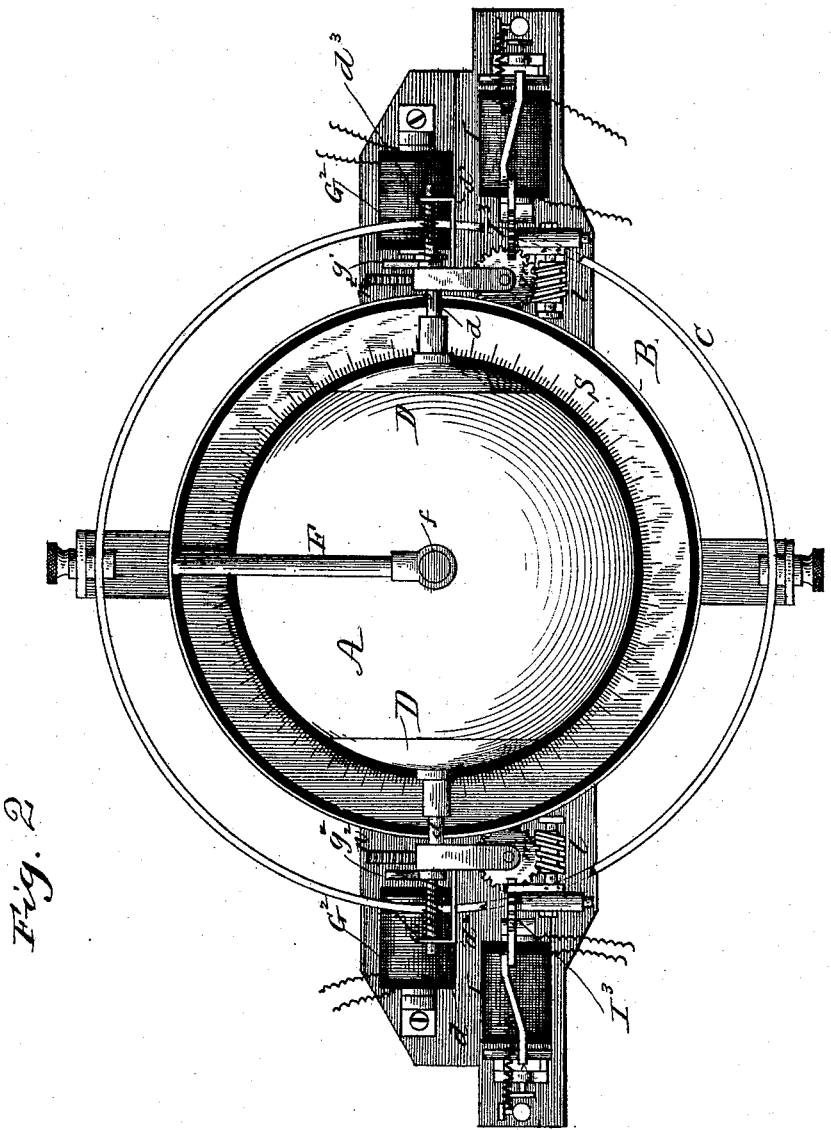
Witnesses:
Inventor:
John O'Neil (No Model.) 7 Sheets—Sheet 3.
J. O'NEIL.
APPARATUS FOR AND METHOD OF REGISTERING AND INDICATING THE COURSE AND POSITION OF MARINE VESSELS.
No. 441,579. Patented Nov. 25, 1890.
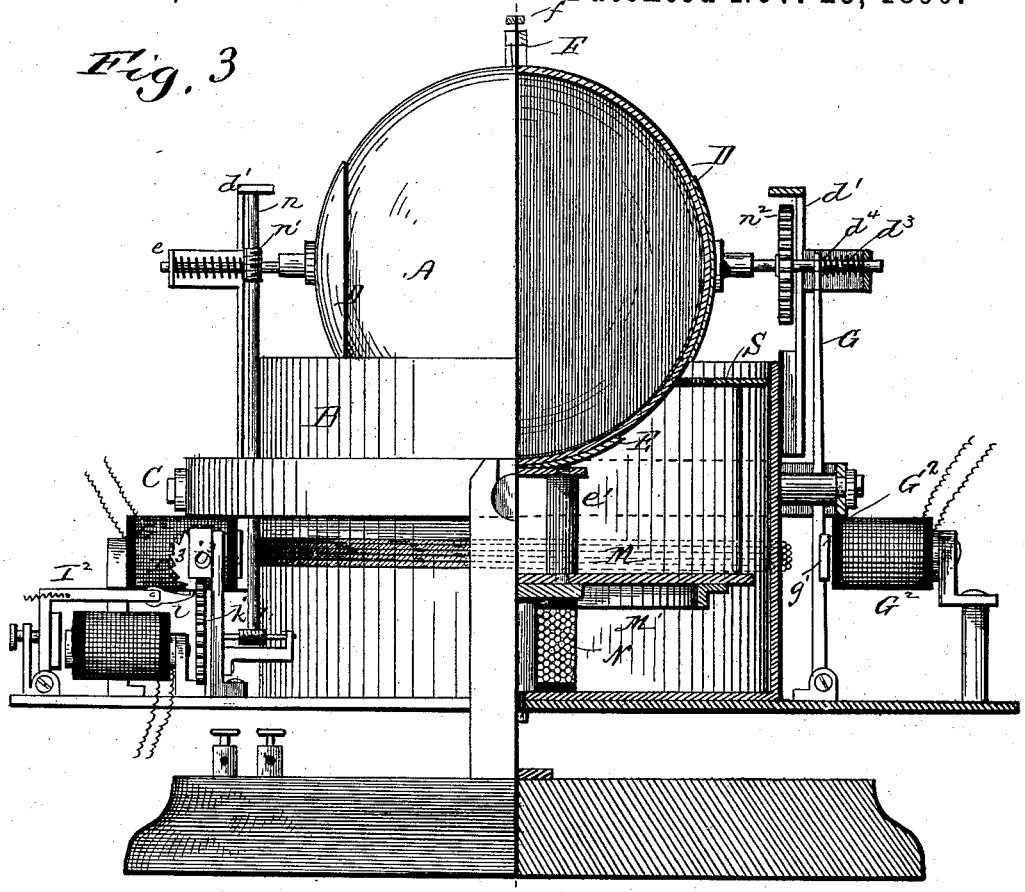
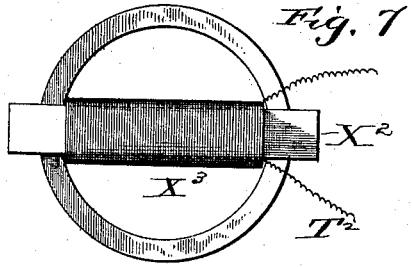
Witnesses:
J. B. McGirr
H. C. Tanner
Inventor:
John O. Neil
by Cornwell Bros.
attys

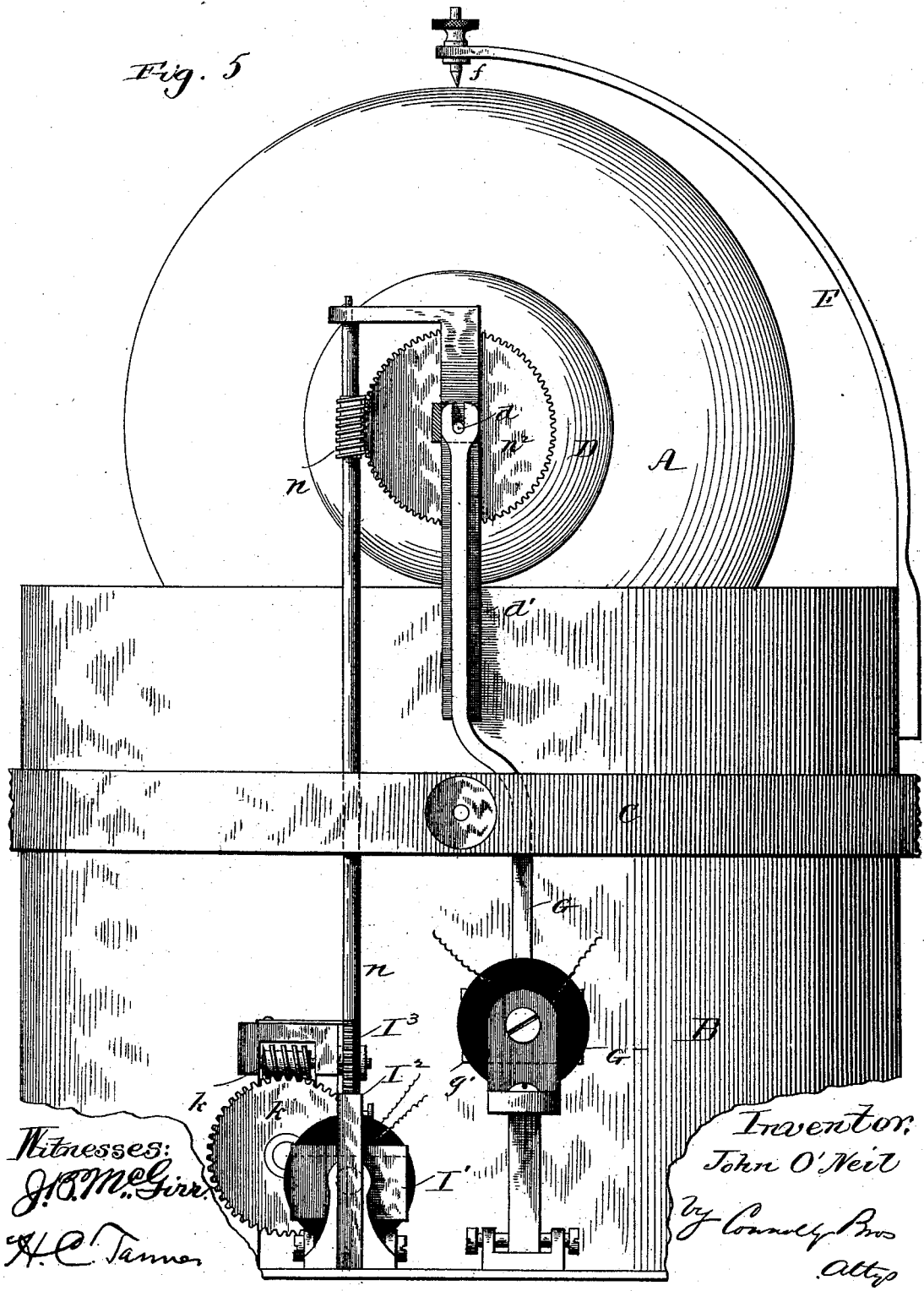

(No Model.) 7 Sheets—Sheet 5.
J. O'NEIL.
APPARATUS FOR AND METHOD OF REGISTERING AND INDICATING THE COURSE AND POSITION OF MARINE VESSELS.
No. 441,579. Patented Nov. 25, 1890.
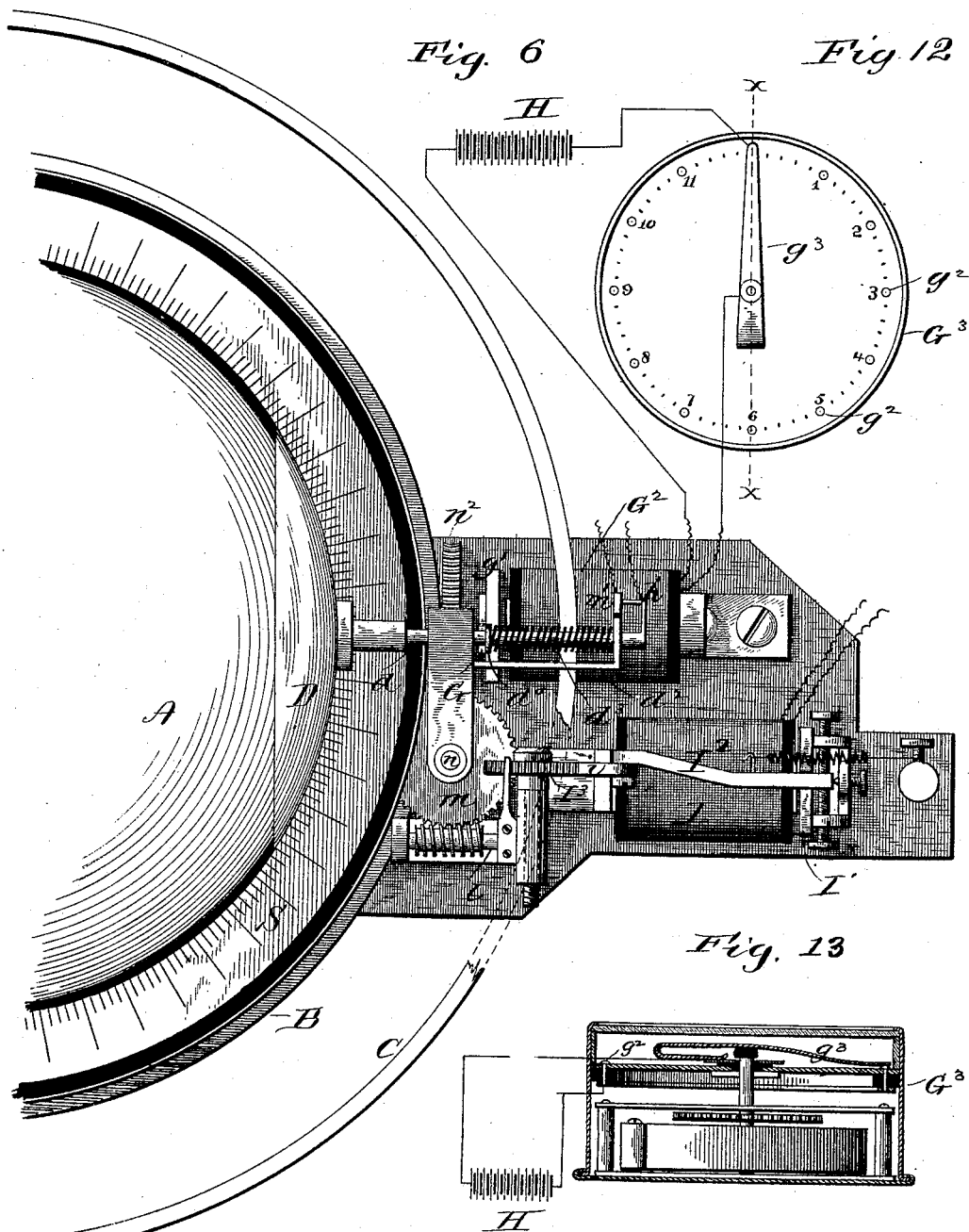
Witnesses:
J. B. McGirr.
H. C. Tanner.
Inventor:
John O'Neil
by Connes Bros
Attys

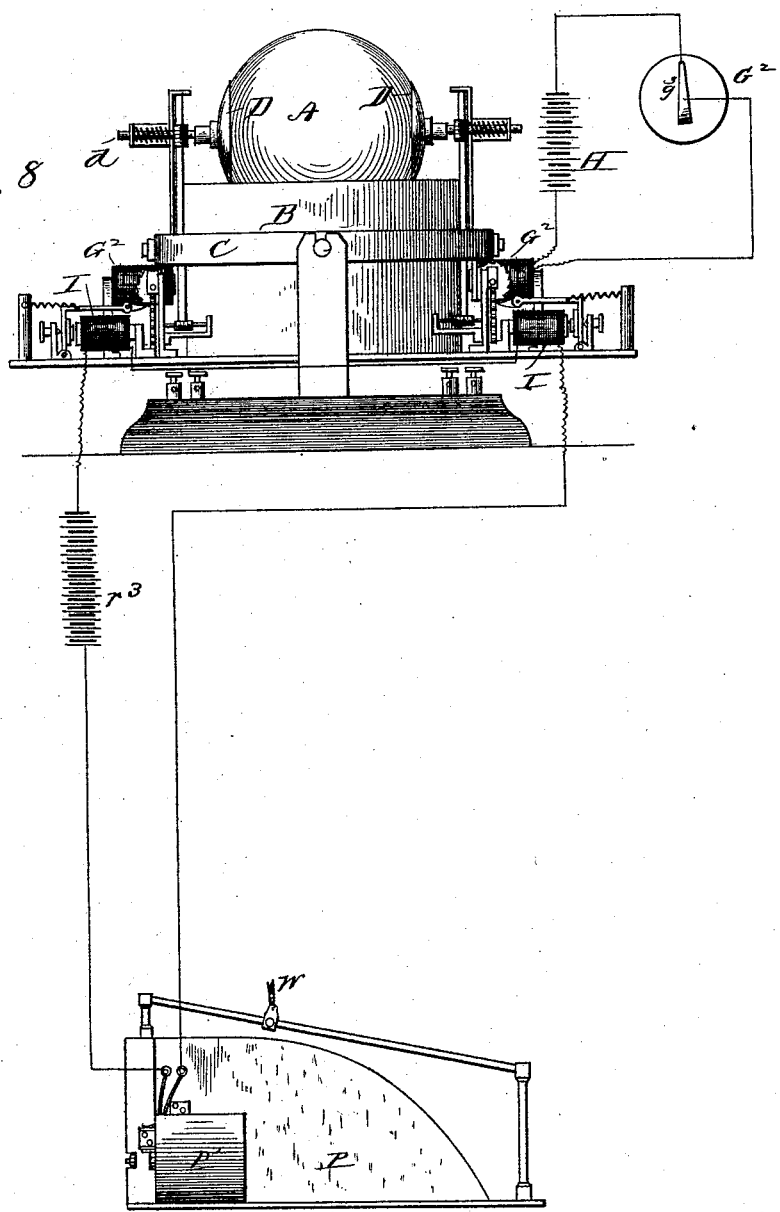

(No Model.)  7 Sheets—Sheet 7.

J. O'NEIL.
APPARATUS FOR AND METHOD OF REGISTERING AND INDICATING THE COURSE AND POSITION OF MARINE VESSELS.

No. 441,579.  Patented Nov. 25, 1890.

Witnesses:
J. B. McGirr.
H. C. Tanner.

Inventor.
John O'Neil
by Conwey Bros
atty

UNITED STATES PATENT OFFICE.

JOHN O'NEIL, OF NEW YORK, N. Y.

APPARATUS FOR AND METHOD OF REGISTERING AND INDICATING THE COURSE AND POSITION OF MARINE VESSELS.

SPECIFICATION forming part of Letters Patent No. 441,579, dated November 25, 1890.

Application filed July 23, 1890. Serial No. 359,649. (No model.)

*To all whom it may concern:*

Be it known that I, JOHN O'NEIL, a citizen of the United States, residing at New York, in the county of New York and State of New York, have invented certain new and useful Improvements in Apparatus for and Method of Automatically Registering and Indicating the Course and Position of Marine Vessels; and I do hereby declare the following to be a full, clear, and exact description of the invention, reference being had to the accompanying drawings, which form part of this specification.

My invention has for its object the provision of novel apparatus for determining and indicating latitude and longitude and for registering the course of ships.

The apparatus embodying my invention may be appropriately termed "an automatic electrical latitudinal indicator and ship's-course-registering compass" to concisely and comprehensively express its action and purpose, which, as will be understood, are to entirely obviate the necessity of taking solar or other astronomical observations to determine the position of marine vessels and to substitute therefor electrically-governed automatically-operating devices, which will exactly determine, indicate, and register the course of a ship throughout its entire voyage and at any time usually indicate its precise geographical position.

My invention contemplates the employment of a globe or other equivalent conventional representation of the earth in conjunction with a magnetic compass and instrumentalities for registering the travel of a vessel under such conditions that the globe will be caused to turn and assume the same position in relation to a fixed pointer or index that is followed and assumed by the vessel in relation to the earth.

My invention consists in the novel construction, combination, and arrangement of devices hereinafter described and claimed, reference being had to the accompanying drawings, wherein—

Figure 10:
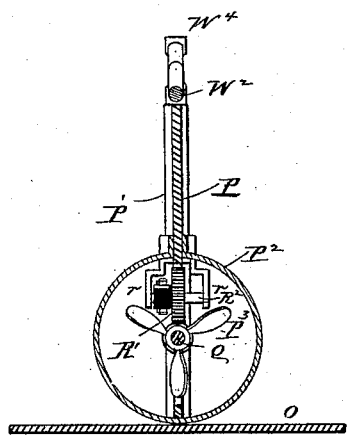
Figure 11:
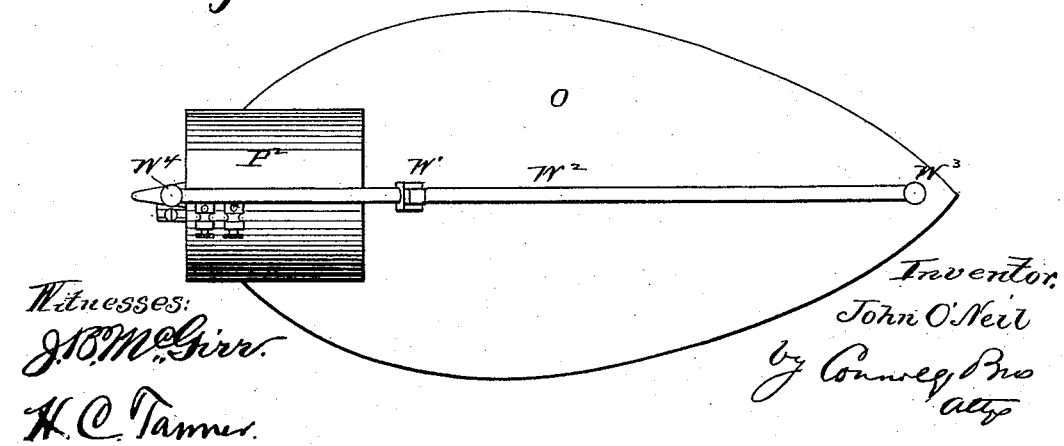

Figure 1 is a perspective view representing in their proper relation the various instrumentalities comprised in the apparatus. Fig. 2 is a plan view of the compass and its connections. Fig. 3 is a side elevation and partial sectional view. Fig. 4 is a side elevation of the registering and indicating apparatus, taken from another point of view. Fig. 5 is a detail elevation, on an enlarged scale, of a portion of the electro-magnetic devices for controlling the movement of the globe. Fig. 6 is a plan view of such devices on a similarly enlarged scale. Fig. 7 is a plan view of a modified form of compass. Fig. 8 is a side elevation of the compass and log mechanism with the compass therein. Fig. 9 is a side view, partially in section, of the log. Fig. 10 is a vertical transverse section on the line $x$ $x$ of Fig. 9. Fig. 11 is a plan view of the log. Fig. 12 is a plan view, and Fig. 13 a sectional view, of the clock-work circuit-closing mechanism.

In carrying out my invention I utilize, as essential to the operation of the apparatus, a terrestrial globe supported above a suitably-constructed magnetic compass and arranged and adapted to turn independently of the latter for certain definite periods and at intervals to rest freely upon the compass-needle and turn therewith. I also employ a clock or clock-work, and in connection therewith electrically-controlled devices by which the globe is supported for certain given periods above and independently of the compass-needle and at intervals released, so as to fall or rest entirely upon the latter. I also employ as a means for effecting and controlling the movement of the globe when raised from the compass-needle an automatic log or other equivalent device combined with a rotary circuit break or commutator, and which, being submerged below the surface of the water and dragged along with the ship, will effect a rotation of the circuit-breaker exactly in proportion to the distance traveled by the vessel and control the rotation of the globe, so as to cause the latter to travel a proportionate corresponding distance in the same time. By means of such apparatus the terrestrial globe, after being set in position relatively to the stationary pointer corresponding to the exact position of the ship, will follow exactly the movement of the latter, the positive rotation of the globe from the log upon its horizontal axis being the measure of the ship's rectilinear travel and the periodical rotation upon and with the compass-needle being the means of obtaining the angle or deviation from rectilinear line of travel.

In the accompanying drawings, A designates a terrestrial globe of any suitable dimensions and made of some light non-magnetic material, such as papier-maché, aluminum, brass, or wood, &c.

B designates the compass-box supported upon gimbals C in the usual manner, so as to maintain the needle in a horizontal position.

D D designate a pair of concavo-convex metallic clamping-plates, which clamp and embrace the globe on opposite horizontal axial sides and are attached to the ends of horizontal rods or stems $d\ d$, passing loosely through upright supports $d'\ d'$, attached to the sides of the compass-box B and provided with laterally-projecting brackets or bent arms $d^2$, through the bent ends of which the stems $d\ d$ project. Pins $e\ e$ are passed through the stems outside the extremities of the brackets $d^2\ d^2$, and spiral springs $d^3\ d^3$ embrace the stems between the supports $d'$ and the bent extremities of the brackets $d^2$.

The clamping-plates D D may be lined or faced with chamois-skin, felt, or other material to give them a purchase upon the globe. The compass-needle, which will hereinafter be described more specifically, supports upon rods $e'\ e'$ a concavo-convex plate E, similar to the clamping-plates D and intended to receive the globe when released from the plates D.

F designates a rod or index supporting arm attached to the side of the compass-box and thence curved over and above the globe and at its upper end provided with an adjustable pointer or index $f$, which, if necessary, may be in the form of a pen, pencil, or marker. This pointer or marker is coincident with the vertical axis of the globe and with the vertical axis of the compass and constantly points to or coincides with the point on the globe corresponding to the geographical position of the ship and indicating its exact latitude and longitude.

G designates forked levers which embrace the stems of the clamping-plates D D, respectively, outside the supports $d'$, and impinge against loose collars $d^4$ upon said shafts or stems, so that when said levers are moved they will move the shafts in the direction of their lengths and compress or release the springs $d^3$.

The levers G carry each an armature $g'$, opposed to the core of a stationary electro-magnet $G^2$, which is in circuit with the dial of a clock $G^3$, having projecting contacts $g^2$, through one of which is closed—say every five minutes—by the hand $g^3$, the circuit from a battery or generator H, leading through the magnet $G^2$. At such periods and by the operation described, the armature $g'$ being attracted, the forked levers G are drawn back and cause the clamping-plates to be released from the globe and the latter to rest upon the compass-needle, which, being free to turn, assumes its proper position, the circuit through the points of the clock-dial being maintained for an appreciable time—say one or two minutes—to give the needle sufficient time to come to rest. The circuit being then opened, the clamping-plates are released, and being retracted again clamp the globe. The globe is rotated intermittently on its horizontal axis by motion conveyed from the log through the medium of the clamping-plates and the appurtenant mechanism hereinafter described.

It being understood, as already suggested, that the "screw" of the log, which will be hereinafter specifically described, closes a circuit from a battery through suitable contacts at intervals depending upon the distance traveled by the vessel, the mechanism by which the globe is rotated a corresponding distance is actuated by the electro-magnet I and its armature $I'$, carrying the lever $I^2$, with pawl or dog $i$. The latter engages with ratchet-wheel $I^3$ and turns the latter the distance of one tooth every time the circuit is closed by the log-screw. The wheel $I^3$ is provided with, say, eighty teeth. Upon its shaft $i^3$ is fixed a worm $k$, which meshes with a worm-wheel $k'$, so proportioned as to turn one tooth with every complete revolution of the ratchet-wheel $I^3$. The wheel $k'$ also has a worm $l$ upon its shaft, engaging with a horizontal worm-wheel $m$ upon an upright shaft $n$, from which, by means of a worm $n'$ and worm-wheel $n^2$ upon said shaft, and the stem of the plates D D, motion is conveyed to the latter and through them to the globe. Theoretically the proportions of this gearing and of the rotating mechanism of the log is such that should the globe be constantly rotated it will move a distance representing one degree for every degree traversed by the ship; but inasmuch as the rotation of the globe is arrested at intervals, while the ship continues in its course, it is necessary to compensate for the loss of unison by a proportionate exaggeration of the movement of the globe during its active periods. This is easily accomplished by so proportioning the gearing that, say, for every knot traveled the globe will rotate a distance equivalent to one knot and such a fractional period as will represent the relation of the inactive interval of the globe to the number of revolutions of the log-screw representing one knot. The slight error, therefore, if it occurs at all, in the indication at any period while the globe is rotating, is corrected at the beginning of the next period. As has been suggested, the globe, after having rotated for a definite period, is released from its operative mechanism and supported by the compass-needle, in order that it may assume from time to time such altered positions as the variation of the ship's course from a rectilinear line necessitates. As will be seen, the globe does not indicate the course of the ship in an absolutely continuous manner. The rotation of the globe upon its horizontal axis is the measure of the distance traveled in a direct line. The direction is indicated through the agency of the compass-needle, which at intervals changes the axial position of the globe, the resultant of the two motions of the globe—one upon a horizontal and the other a vertical axis—being the course of the ship, and the position of the index above the globe indicating at all times the latitude and longitude. The compass-needle being an essential element of the apparatus should be made with a view to avoiding as far as possible all dangers of inaccuracy. While it may be sufficient to employ a permanently-magnetized steel bar, as shown at M, it may be found more expedient and advantageous to substitute therefor, as shown at $X^2$, a bar of soft metal supporting a helix $X^3$, which being in circuit with a branch or shunt $T^2$ of the clock-circuit will be energized only when the globe is released from its clamps and is supported by the compass-needle. By such an expedient I obviate the deleterious effect of over-magnetization of the needle and the consequent supersensibility to disturbing earth-currents and other extreme sources of inaccuracy.

In Figs. 1 and 3 I have illustrated the needle as a permanently-magnetized steel bar M, supported on a brass or other non-magnetic ring M' and provided with supports $e'$ for the concavo-convex plate or disk E in which the globe rests. I deem it advisable to maintain the needle quiescent whenever it has come to its proper position, and accomplish this end by a suitably-arranged magnet N, located, say, in the center of the compass-box below the needle and in circuit with the terminals $m'$ and $h'$, which are closed when the clamps D are against the globe and open when the former are withdrawn.

The attraction of the magnet N will be sufficient to prevent the rotation or movement of the needle unnecessarily and to limit the movement to the assumption of such positions as the departure of the vessel from a given line requires. An annular compass-card S may be supported on the compass-needle by standards $s\ s$, if desired.

In order to insure greater accuracy in the indications of the compass-needle when a permanent magnet is used for the purpose, it may be expedient to inclose the needle within an artificially-disposed magnetic field, which will counteract the influence of external electricity or magnetism. This magnetic field is produced by incasing or surrounding the compass-box with a helix in circuit with a battery and electrically charging the helix whenever the needle is brought into requisition.

The log is shown in Figs. 12 to 14 and comprises a suitable metallic frame-work consisting of a flat base or shoe O and a pin P, rising from the center of the base and running lengthwise of the latter, the edges of the base converging on curved lines toward a point or nose P', so as to offer but slight resistance to the water. A cylindrical open-ended casing or tube $P^2$ is fitted to the rear of the nose P' and incloses an obliquely-winged wheel or screw $P^3$, adapted to rotate by the pressure or impact of the water passing through the casing. The screw or winged wheel is supported by a horizontal shaft Q, upon which is a worm R engaging with a worm-wheel R', the shaft $R^2$ of which is supported in brackets $r$ and has mounted on it a contact wheel or sleeve $r'$, which at every half-revolution of the shaft $R^2$ closes an electric circuit from a battery $r^3$ through the magnet I, which controls the movement of the globe. The winged wheel or screw is so shaped and proportioned according to well-known rule of mechanical construction that it will rotate a certain number of times for a given distance traveled through the water, the pressure or resistance being exactly proportioned to the speed of the vessel. It will be readily comprehended that it is only necessary for the globe to rotate proportionately to the rotation of the log-wheel without reference to the element of time the distance traveled in a given time, and the actual speed of the vessel being in any event convertible terms. Thus, if the log-wheel makes, say, seventy-two thousand nine hundred and sixty-four revolutions in an hour it will indicate that the vessel has traveled a certain distance—say one mile—or if in traveling through one degree the wheel rotates a proportionate number of times, which it will regardless of the speed of the vessel, the globe being rotated proportionate to each revolution, it will move a distance corresponding to one degree.

The log when in action is suspended from and below the water-line by means of a cable W, attached to an adjustable sleeve W', which embraces a rod $w^2$, running lengthwise of the log-frame and supported on standards $w^3\ w^4$. The wires leading from the battery $r^3$ on board the vessel to the contacts on the log are preferably carried in this cable and insulated thereby. When the log is dropped, it assumes by reason of its shape a proper position in the water, its screw being axially coincident with the line of travel of the vessel. The log should be submerged a sufficient distance below the surface to prevent its being influenced by the wave movements.

While I have specifically described a terrestrial globe as a feature of the apparatus, I do not restrict or limit myself to this exact device, but may, if found expedient, employ any other conventional representation of the earth as a portion of the globe. So, too, I may employ a globe in which the markings are artificial or exaggerated—as, for instance, a globe on which a portion of the earth's surface only is indicated.

Having described my invention, I claim—

1. In an automatic electrical latitudinal indicator and ship's-course-registering compass, the combination of a revolving wheel carried by a log, a commutator receiving motion from said wheel, brushes contacting with said commutator, conductors connecting the brushes with an electro-magnet and battery aboardship, a train of gearing operated by said magnet, a globe revolved upon a horizontal axis by said gearing, a magnetic compass-needle adapted to support said globe and revolve it upon a vertical axis, a clamping device adapted to clamp and hold the compass-needle during fixed intervals, an electro-magnet adapted to operate said clamping device, and a clockwork mechanism having contact-points electrically connected with said clamping electro-magnet and a battery, all constructed and arranged substantially as described.

2. In a latitude and longitude indicator for ships, a terrestrial globe, a rotating log, mechanism for communicating rotary motion from the log to the globe, mechanism for disconnecting the log and globe at intervals, a compass-needle adapted to support the globe when disconnected from the log, a clamp adapted to hold the compass-needle stationary while the globe and log are connected, and clockwork mechanism adapted to release said clamp at intervals, all constructed, arranged, and operating substantially as and for the purpose described.

3. In a position-indicating apparatus for ships, a compass, a globe adapted to be supported thereon at intervals, and means, substantially as described, and comprising a revolving log and connecting mechanism for causing said globe to revolve upon a horizontal axis at intervals when not resting upon the compass at a rate proportional to the speed of the vessel, substantially as described.

4. In a position-indicating apparatus for vessels, a terrestrial globe, a revolving log connected to and imparting motion to said globe, and a stationary pointer or stylus for indicating on the globe the distance traveled, all combined, constructed, and arranged substantially as herein described.

5. In a position-indicating apparatus for vessels, a terrestrial globe, mechanism for imparting rotary motion on a horizontal axis to said globe, such motion being proportional to the distance traveled by the vessel, and mechanism for revolving said globe upon a vertical axis at intervals, and all constructed, combined, and operating substantially as herein described.

6. In a position-indicating apparatus for vessels, a rotary log, a terrestrial globe connected to and adapted to be rotated on a horizontal axis by said log proportional to the travel of the vessel, a compass-needle adapted to rotate said globe on a vertical axis, and mechanism, substantially as described, for alternately connecting the compass and the log with the globe, all combined, constructed, and arranged substantially as described.

7. In a position-indicating apparatus for vessels, the combination, with a rotary log, an electric circuit, and a commutator arranged in said circuit and revolved by the log, of an electro-magnet also in said circuit, a ratchet-wheel adapted to receive a step-by-step motion by means of a dog connected to the armature of said electro-magnet, with a rotating shaft receiving motion from said ratchet-wheel, and a terrestrial globe receiving rotary motion from said shaft, substantially as described.

8. In a position-indicating apparatus for vessels, the combination of a log, a screw mounted on a shaft journaled on said log, a commutator revolved by said shaft, brushes contacting with said commutator, an electro-magnet in circuit with said brushes, a gearing receiving motion from the armature of said electro-magnet, a longitudinally-movable shaft receiving rotary motion from said gearing, and a terrestrial globe connected to said shaft with a supplementary electro-magnet having its armature connected to said shaft, so that the movement of said armature will move said shaft longitudinally, a clock-work mechanism, and contact-points electrically connected with said supplementary electro-magnet and brought together at intervals by said clock-work, all constructed, arranged, and operating substantially as described.

9. The herein-described method of determining the position of vessels at sea, consisting in automatically rotating a terrestial globe with relation to a fixed point on a horizontal axis an amount proportional to the travel of the vessel on degrees of latitude and on a vertical axis a distance proportional to the travel of the vessel on degrees of longitude.

10. An apparatus for electrically and automatically indicating the longitude of a ship and registering the ship's course, comprising a rotary log adapted to rotate proportionately to the ship's travel and to close an electric circuit at intervals determined by the number of rotations, a compass-needle, a terrestrial globe arranged and adapted to rotate on a horizontal axis, and mechanism, such as described, whereby the said globe is caused to rotate on a horizontal axis proportionately to the rotation of the log, and at intervals is rotated independently thereof and upon a vertical axis by the compass-needle.

11. In an apparatus for indicating the position and course of a marine vessel, the combination, with suitable automatic mechanism for operating the same, of a terrestrial globe, as and for the purpose set forth.

12. In an apparatus for indicating the position and course of a ship, a globe arranged and adapted to rotate in one direction relatively to a fixed point and proportionately to the distance traveled by the ship, and in another direction corresponding to the movement of the compass-needle.

13. In an apparatus for indicating the position and course of ships, the combination, with a compass-needle, of a terrestrial globe arranged and adapted to be supported at intervals thereby.

14. In an apparatus for indicating a ship's course and position, the combination, with a terrestrial globe, a compass-needle arranged and adapted to govern the movement of the globe in one direction and with mechanism for rotating said globe in another direction, substantially as described.

15. The herein-described method of indicating the position of vessels at sea, consisting in automatically rotating a terrestrial globe on a horizontal axis by means of a rotary log and rotating the globe at intervals on a vertical axis by means of a compass-needle, whereby the globe will be so rotated with relation to a fixed point that such point will at all times designate on the globe the position of the vessel.

16. The method of indicating the position of a vessel, consisting in rotating a terrestrial globe with relation to a fixed point or stylus accordingly as the ship travels, so as to keep the point or stylus at that point on the globe corresponding to the position of the vessel on the earth.

17. In an apparatus for indicating the course of a vessel, the combination of mechanism adapted to rotate a shaft at a rate proportional to the speed of the vessel, means for securing a globe against the end of said shaft and releasing it from the same at definite intervals, with a compass-needle, a support for said globe secured to the needle, and a periodically-operated stop adapted to release the needle when the globe is supported on the same, substantially as described.

18. In an apparatus for indicating the course and position of a vessel at sea, a terrestrial globe, a horizontal shaft revolving at a rate proportional to the speed of the vessel, a clamp for securing the globe to the shaft, a releasing device adapted to operate periodically and disengage the globe from the shaft, a pivotally-supported electro-magnet provided with means for supporting the globe when released from the shaft, an electric battery and contact-points in circuit with said electro-magnet, and a clock-work or equivalent mechanism adapted to close said contacts, thereby energizing said electro-magnet during the period the globe is released from the shaft, all constructed, arranged, and operating substantially as described.

19. In an apparatus for indicating the course and position of vessels, a rotary log, a commutator operated thereby, an electro-magnet in circuit with such commutator, a train of gearing operated by said electro-magnet, a horizontal shaft rotated by said gearing, an electro-magnet connected to said shaft and adapted to move the same lengthwise, a periodically-operated circuit-closing device in circuit with the last-named magnet, a socket on the end of said shaft, a globe resting in said socket, an opposing socket at the opposite side of said globe, a compass-needle arranged beneath the globe, a seat on said needle for the reception of the globe, a retarding device or stop for said needle, an electro-magnet adapted to operate said retarding device or stop, and a periodically-operated circuit-closing device in circuit with the stop-operating magnet, all constructed, combined, and operating substantially as and for the purpose described.

In testimony that I claim the foregoing I have hereunto set my hand this 9th day of July, 1890.

JOHN O'NEIL.

Witnesses:
THOS. A. CONNOLLY,
JOS. B. CONNOLLY.